United States Patent [19]
Sahara

[11] 3,961,338
[45] June 1, 1976

[54] AUTOMATIC EXPOSURE TIME CONTROL DEVICE FOR USE IN SINGLE LENS REFLEX CAMERA

[75] Inventor: Masayoshi Sahara, Toyokawa, Japan

[73] Assignee: Minolta Camera Kabushiki Kaisha, Osaka, Japan

[22] Filed: Apr. 22, 1975

[21] Appl. No.: 570,320

[30] Foreign Application Priority Data
Apr. 24, 1974 Japan................................ 49-46801

[52] U.S. Cl.................................... 354/24; 354/51; 354/60 R; 354/235; 354/258
[51] Int. Cl.²........................ G03B 7/08; G03B 9/62
[58] Field of Search ................... 354/24, 29, 38, 50, 354/51, 60 R, 234, 235, 238, 258

[56] References Cited
UNITED STATES PATENTS
| | | | |
|---|---|---|---|
| 3,815,148 | 6/1974 | Ikeda et al. | 354/24 |
| 3,831,180 | 8/1974 | Tsujimoto | 354/51 |

*Primary Examiner*—L. T. Hix
*Assistant Examiner*—Russell E. Adams, Jr.
*Attorney, Agent, or Firm*—Wolder & Gross

[57] ABSTRACT

In a device including a light measuring circuit having a photocell for receiving light from the object to be photographed to give an output and operable to convert the output to a voltage proportional to the logarithm of the intensity of the light, a memory capacitor for storing the output voltage of the circuit, an antilogarithmic conversion transistor for subjecting the voltage stored in the capacitor to antilogarithmic conversion to produce a current in proportion to the light intensity, a capacitor for integrating the current simultaneously with the initiation of opening of the shutter, and a control circuit for giving an exposure time under the control of the voltage charged in the capacitor, the improvement comprising a first switch and a second switch arranged in series with each other and provided between the emitter of the transistor and the connection of the emitter to a lead wire extending from one terminal of a power source, the switches being so positioned that only the emitter current of the transistor passes through the switches. The first and second switches are opened and closed in response to the operation of the shutter.

5 Claims, 10 Drawing Figures

AUTOMATIC EXPOSURE TIME CONTROL DEVICE FOR USE IN SINGLE LENS REFLEX CAMERA

BACKGROUND OF THE INVENTION

This invention relates to an automatic exposure time control device for use in a single lens reflex cameras, more particularly to such control device suitable for use in single lens reflex cameras having a TTL light measuring system.

With single lens reflex cameras of the TTL light measuring type, the rays coming from the object to be photographed and incident on the photocell is blocked by the reflecting mirror which is swung up after the shutter is released, so that for automatic exposure time control, there is the necessity of storing the information of the brightness of the object before the mirror is swung up. A system is known for controlling the exposure time with accuracy in response to widely varying intensities of the light from the object. According to this system, a voltage proportional to the logarithm of the intensity of light from the object is stored in a capacitor before the reflecting mirror is swung up and, for the commencement of exposure, the logarithmically converted voltage is converted to a current in proportion to the light intensity by antilogarithmic conversion which current is charged in another capacitor. When the voltage of the capacitor reaches a specified value, the shutter is closed. This system requires a high input impedance element as an input circuit subsequent to the memory capatitor. A field effect transistor is usable as such high input impedance element, but it involves great drift due to temperature and therefore has the drawback of necessitating a circuit for compensating for the drift. Supposedly, another type of high impedance circuit is usable, but the circuit still has the drawback of requiring a high power source voltage. In order to overcome these drawbacks, the present inventor et al. have already proposed an automatic exposure time control device as disclosed in U.S. Pat. application Ser. No. 429,391. This device is illustrated in FIG. 1. With reference to the Figure, a trigger switch 8' is provided between the negative terminal of a power source E and the emitter of an antilogarithmic conversion transistor 4 connected to the output terminal of a light measuring circuit 1 which responds, in the known manner, to the light traversing the camera objective lens L and diaphragm A. The switch 8' is closable with the initiation of movement of a shutter opening member after the shutter has been tripped and is openable in relation to completion of film winding operation. The system further includes a switch 7' disposed between the trigger switch 8' and a memory capacitor 2 on a lead wire connected to the negative terminal of the power source E. The switch 7' is closed at the initial stage of operation of the shutter button and is opened upon the completing of movement of a shutter closing member. The switch 7' also serves as a power source switch for a control circuit 9, an electromagnet 10 and the transistor 4. As will be apparent from the above description, the switch 8' is always open before the shutter is opened, so that the potential stored in the memory capacitor 2 will not leak from between the base and the emitter of the transistor. Thus it is possible to use a usual transistor as the transistor 4. However, when the travel of the shutter is initiated with the switch 7' closed after the shutter button is depressed, the whole current passing through the transistor 4 and the control circuit 9 passes through the switch 7', resulting in a large contact potential difference at the switch 7' and consequently leading to an error in the exposure time. More specifically, the contact resistance of the switch 7' varies within the approximate range of 100 to 300 mΩ and, if a current of 15 mA passes through the switch 7' with the initiation of travel of the shutter, the voltage drop occurring between the opposite terminals of the switch 7' is about 3 mV on average. As is well known, when the voltage between the base and the emitter of transistor changes by about 18 mV at ordinary temperature (25°C), the resulting changes in the current between the base and the emitter and in the collector voltage are two-fold. Accordingly, since 18 mV corresponds to 1 EV, the voltage drop due to the resistance of the switch 7' gives to the exposure an influence which is numerically 0.17 EV on average. This influence is not negligible.

SUMMARY OF THE INVENTION

An object of this invention is to provide an automatic exposure time control device of the type described in which two switches connected to each other in series are provided between the emitter of the above-mentioned antilogarithmic conversion transistor and the connection of the emitter to a lead wire extending from one terminal of the power source, the switches being openable and closable with suitable timing so as to ensure accurate exposure time control.

Another object of this invention is to make the switches operable accurately and properly by shutter operating members and members operatively connected thereto.

In an automatic exposure time control device for use in a single lens reflex camera including a light measuring circuit having a photocell for receiving light from the object to be photographed to give an output and operable to convert the output to a voltage proportional to the logarithm of the intensity of the light, a memory capacitor for storing the output voltage of the circuit, an antilogarithmic conversion transistor for subjecting the voltage stored in the capacitor to antilogarithmic conversion to produce a current in proportion to the light intensity, a capacitor for integrating the current simultaneously with the initiation of opening of the shutter, and a control circuit for giving an exposure time under the control of the voltage charged in the capacitor, the present invention provides the improvement comprising a first switch and a second switch arranged in series with each other and provided between the emitter of the transistor and the connection of the emitter to a lead wire extending from one terminal of a power source, the switches being so positioned that only the emitter current of the transistor passes through the switches. After shutter release operation, the first switch is closed simultaneously with the initiation of movement of a member for bringing the shutter into opening action and is opened by shutter cocking action. The second switch is closed during the period following the cocking of the shutter until the shutter is opened subsequent to the operation of the shutter button. The second switch is opened simultaneously with or after the initiation of movement of a member which starts to close the shutter.

Since the first switch or the second switch is always open before the shutter is opened, the potential stored in the memory capacitor will not leak from between the base and emitter of the transistor. It is therefore possible to employ a usual transistor for that transistor. Moreover, since the collector current of the antilogarithmic conversion transistor is up to a maximum of 1 mA, the voltage drop to be produced between the opposite terminals of each of the first and second switches is greatly reduced to thereby substantially minimize the influence to be exerted on the exposure. Thus the influence is negligible, if any. As a result, the present device assures automatic exposure time control with very high accuracy.

The first and second switches are operated by shutter operating means or means associated therewith. More specifically according to one embdiment of this invention, the shutter mechanism includes a control member which is turnable in operative relation to film winding operation after shutter release operation, to cock a shutter opening blade and a shutter closing blade. For shutter release operation, the control member starts to move with the rise of a mirror and diaphragm stopping-down movement and, upon completion of the rise of the mirror and the stopping-down movement, the control member releases a shutter opening drive member for driving the shutter opening blade. The first switch is positioned in opposing relation to one arm of the control member. When the control member frees the opening drive member from a holding lever, permitting the shutter opening blade to start to move, the control member closes the first switch. When pushing the opening drive member during shutter cocking operation, the control member opens the first switch.

The shutter mechanism includes an intermediate lever operable with a shift lever and with retraction of the mirror to the photographing position, and an intermediate diaphragm lever operable under the action of the intermediate lever. The intermediate diaphragm lever frees a diaphragm operating pin from diaphragm open position and causes the same to stop down the diaphragm to a preset position. The intermediate diaphragm lever is returnable with the return of the shift lever after the shutter closing blade is operated for completion of exposure. The intermediate diaphragm lever has one arm opposing the second switch to close the switch simultaneously with the retraction of the mirror, namely before the shutter is actuated. The arm opens the switch simultaneously with the above-mentioned return, namely after the shutter operation.

Further according to another embodiment of this invention, the second switch is disposed in opposed relation to one arm of a closing drive member for driving the shutter closing blade and is opened in operative relation to the movement of the closing drive member following the completion of counting operation of the electronic shutter. The switch is closed in operative relation to the return of the drive member to its latched position by shutter cocking operation.

Accordingly, the first and second switches are operated accurately with proper timing in accordance with the shutter operating means or means associated therewith.

Other objects and features of this invention will become apparent from the following description.

DESCRIPTION OF THE PREFERRED EMBODIMENTS

Figure 1:
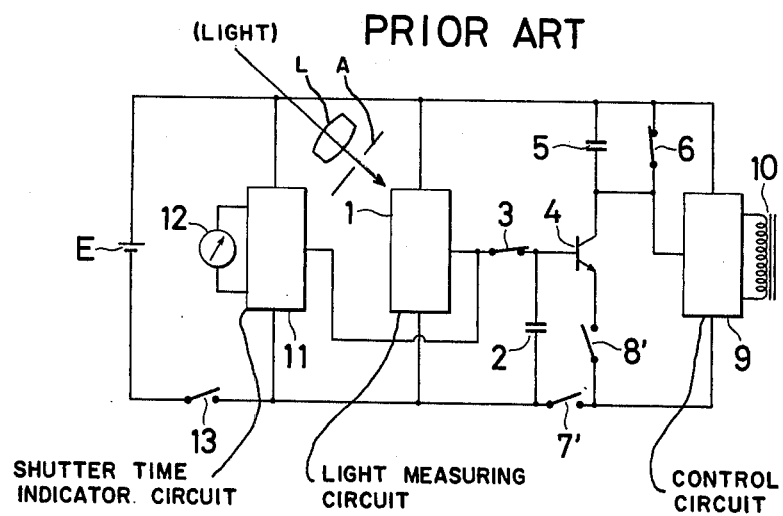
FIG. 1 is an electric circuit diagram showing a conventional embodiment.
Figure 2:
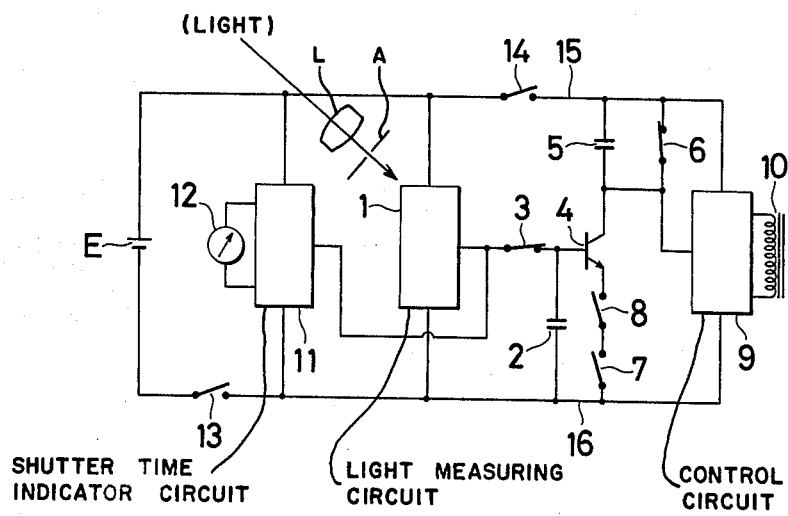
FIG. 2 is a diagram showing the electric circuit of an embodiment of this invention.

FIG. 2 shows a light measuring circuit 1 including a photocell such as CdS or exposed to light traversing the camera objective lens L and diaphragm A, in the known manner, SBC and a circuit for logarithmic conversion of the output of the photocell to generate an output in proportion to the logarithm of the intensity of light from the object to be photographed, a memory capacitor 2 for storing the output of the circuit 1, and a memory switch 3 provided between the light measuring circuit 1 and the memory capacitor 2. The switch 3, which is usually closed, is opened before the shutter is opened, in operative relation to the movement of a reflecting mirror or the like to permit the capacitor 2 to store the logarithmically converted output. Indicated at 4 is a transistor for converting the output voltage stored in the capacitor 2 to a current in proportion to the antilogarithm thereof, the current being proportional to the intensity of light from the object to be photographed.

An integrating capacitor 5 is connected to the collector of the transistor 4 and to a lead wire 15 connected to the positive terminal of a power source E. A switch 6 for discharging the capacitor 5 is usually closed and must be opened simultaneously with or slightly before the shutter is opened. Preferably, the switch 6 is closed when the shutter is completely closed. A first switch 8 is closed simultaneously when a member is initiated into movement which member starts to open the shutter after a shutter release action. The switch 8 is opened in operative relation to a shutter cocking action. A second switch 7 is closed after the shutter button is operated but before the shutter is opened or in operative relation to a shutter cocking action. The switch 7 is opened after the completion of movement of a member which starts to close the shutter or simultaneously with the movement of that member. FIG. 2 further shows a control circuit 9 comprising a known Schmitt trigger or like circuit, an electromagnet 10 for retaining a rear curtain, a shutter time indicator circuit 11 for receiving an input from the light measuring circuit 1, an indicator 12 such as a meter, a power source switch 13, and a power source switch 14 such as a magnet switch provided for the transistor 4 and the control circuit 9. The switch 14 is closed after the operation of the shutter button but before the shutter is opened. The switch 14 is opened when the shutter is completely closed. Indicated at 16 is a lead wire connected to the negative terminal of the power source E.

The overall circuit described above will operate as follows. The current at the collector of the transistor 4 is up to a maximum of 1 mA, and the voltage drop occuring between the opposite terminals of the second switch 7 is of the order of 200 mΩ × 1 mA = 0.2 mV, so that the voltage drop at the switch 7 gives to the exposure an influence of $0.2/18 \approx 0.011$ EV which is almost negligible. The same is true of the switch 8 although description is omitted. The switch 14 also involves a voltage drop, but the collector current is free of the resulting influence as will be apparent from the characteristic relationship between the collector current and collector coltage of the transistor. The voltage drop therefore does not influence the exposure.

Figure 3A:
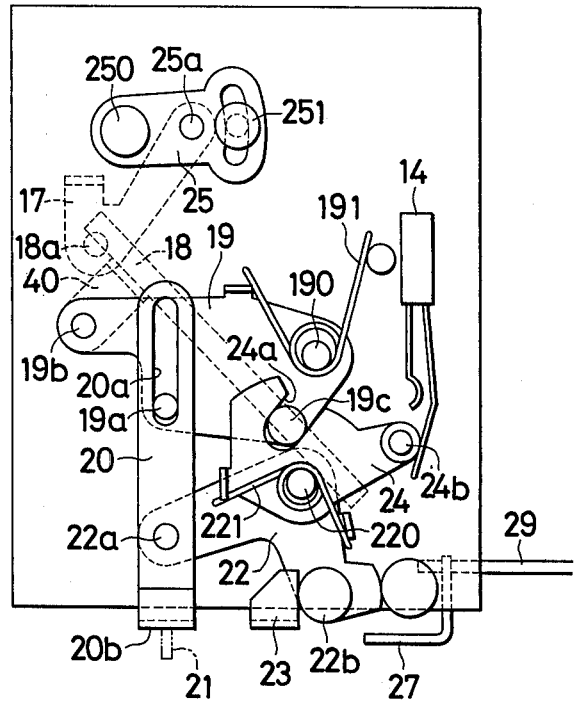
FIGS. 3a and 3b are side elevations of the mirror box of the above embodiment to show the operation of the constitutent members.
Figure 3B:
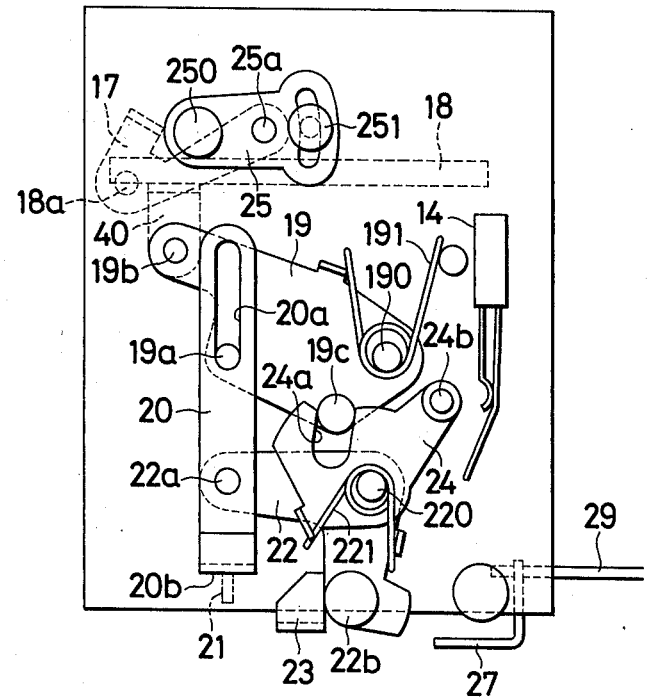
Figure 4A:
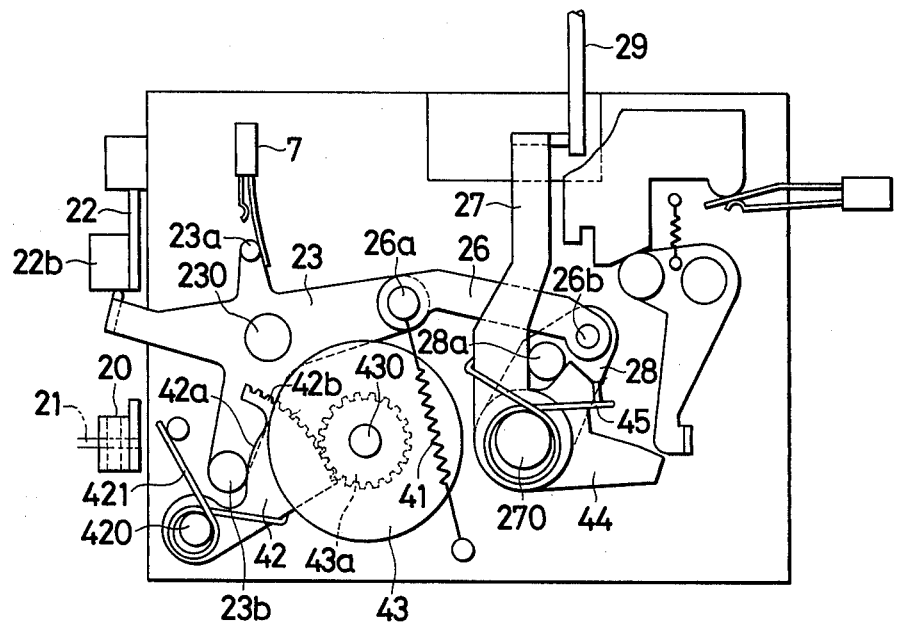
FIGS. 4a and 4b are bottom views of the same mirror box to show the operation of the members.
Figure 4B:
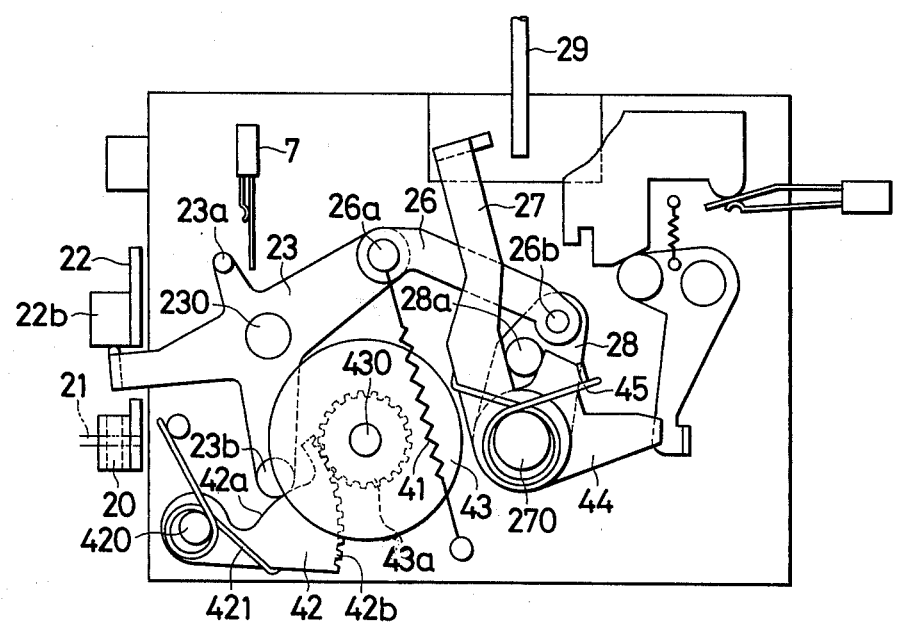
Figure 5A:
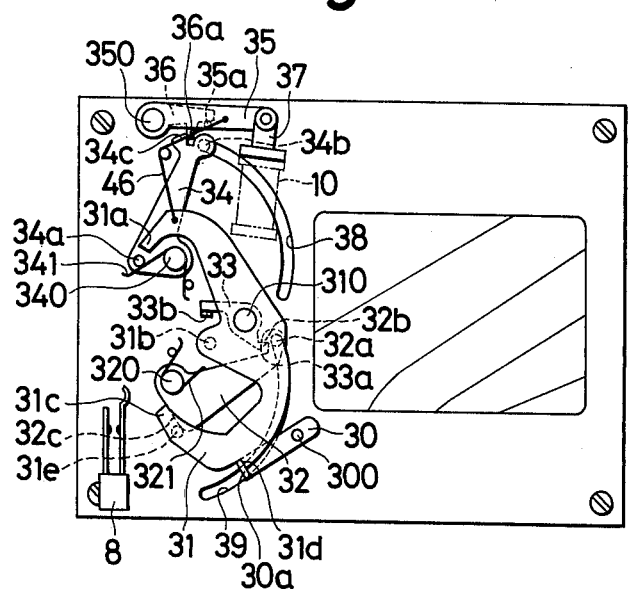
FIGS. 5a and 5b are views showing the shutter mechanism of the embodiment to show the operation of the constituent members.
Figure 5B:
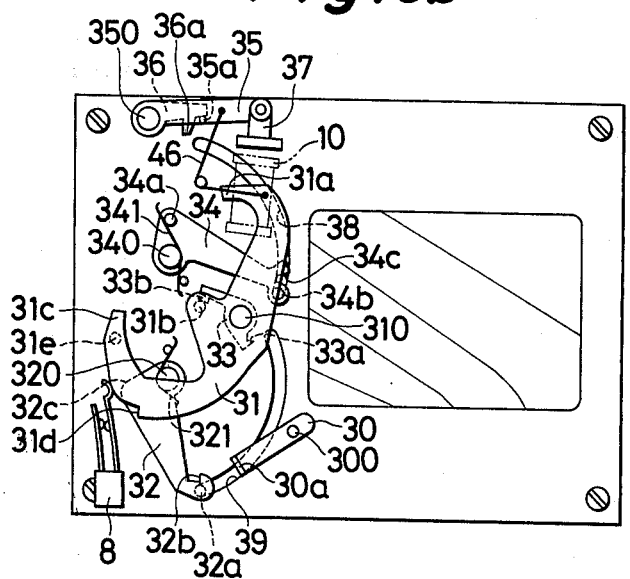
Figure 6A:
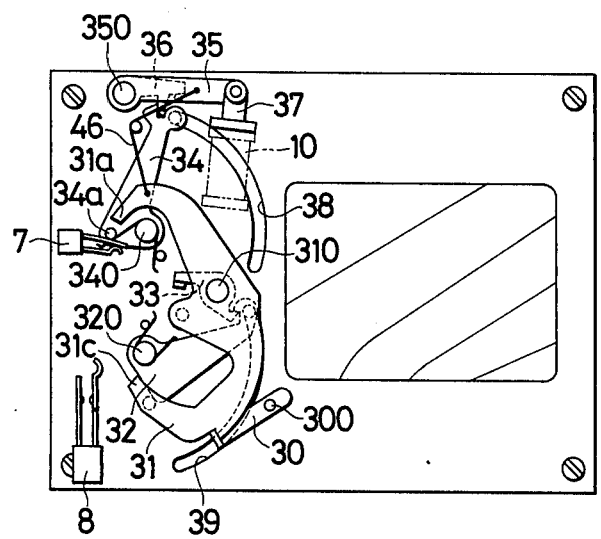
FIGS. 6a and 6b are views showing the shutter mechanism of another embodiment to show the operation of the members thereof.
Figure 6B:
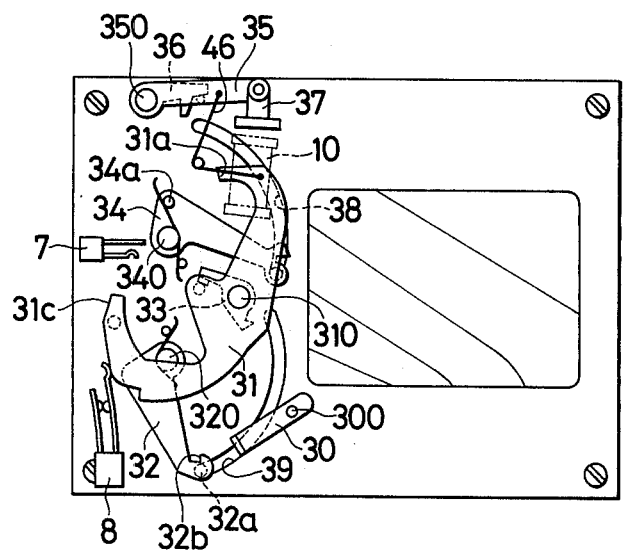

Specific embodiments of the camera will now be described. FIGS. 3a and 3b are side elevations showing the mirror box of an embodiment, FIGS. 4a and 4b are bottom views of the mirror box, FIGS. 5a and 5b are views showing the shutter mechanism of the embodiment, and FIGS. 6a and 6b are views showing the shutter mechanism of another embodiment. FIG. 3 shows a drive plate 21 movable by a shutter release operation from the lowered position shown in FIG. 3a to the raised position in FIG. 3b, thereby initiating the mirror into consecutive movement from photographing position to retracted position. A shift lever 20 is movable in response to the drive plate 21 and has an L-shaped end 20b bearing against the drive plate 21 under the action of an unillustrated spring. The shift lever 20 is formed with a slit 20 receiving therein a pin 19a mounted on a mirror operating lever 19 to be described later. The lever 20 further has at an approximate midportion thereof a circular bore in which engages a pin 22a on an intermediate lever 22 to be described later so as to stop down the diaphragm. The intermediate lever 22 is pivotally mounted on a pin 220 and is biased in a counterclockwise direction by a diaphragm restoring spring 221 provided between the lever 22 and a cam lever 24 on the pin 220. The intermediate lever 22 has an arm carrying the pin 22a in engagement with the shift lever 20 and another arm provided with a pin 22b in engagement with an intermediate diaphragm lever 23. The mirror operating lever 19, pivotally mounted on a pin 190, is biased by a spring 191 in a counterclockwise direction and acts to always depress the shift lever 20 through the engagement of the pin 19a in the slit 20a. When moving upward, the shift lever 20 pushes the pin 19a, turning the lever 19 in a clockwise direction and causing pins 19b and 19c on the lever 19 to raise the mirror 18 and to close the magnet switch 14 respectively. A cam lever 24 supported by the same pin 220 as the intermediate lever 22 is biased in a clockwise direction by the diaphragm restoring spring 221 and has a cam groove 24a for receiving the pin 19c on the lever 19 and a portion 24b engageable with the magnet switch 14. At the initial stage of rise of the shift lever 20, slight clockwise movement of the mirror operating lever 19 turns the lever 24 in a counterclockwise direction by virtue of the engagement of the pin 19c in the cam groove 24a to close the open switch 14. A holder 40 substantially joined with the mirror 18 is connected to the mirror operating lever 19 by the pin 19b. A mirror supporting lever 17 pivoted to a pin 25a on an adjusting plate 25 has at its one end a pin 18a fitted in one end of the mirror 18. The adjusting plate 25 is fixed in place by a screw 250 and a screw 251 engaged in a slot in the plate 25, and the position of the plate 25 is adjustable by these means so as to adjust the position of the mirror 18 to coincide the image on the finder with the photographing surface.

With reference to FIG. 4 showing the bottom of the mirror box, the intermediate diaphragm lever 23 partly shown in FIG. 3 is pivotally mounted on a pin 230 and is biased in a clockwise direction by a spring 41. The lever 23 is in engagement with the intermediate lever 22 and is thereby prevented from turning in a clockwise direction. It has an arm 23a to keep the second switch 7 open before the shutter is released (before mirror release) in the state of FIG. 4a and an arm 23b engaging an inertia member to be described later. A link plate 26 connects the intermediate diaphragm lever 23 and an interlocking lever 28 together at pins 26a and 26b. A diaphragm driving lever 27 is pivoted to the same pin 270 as the interlocking lever 28 and connected thereto by a spring 45, a pin 28a on the lever 28 and a lever 44. The lever 44 serves to make the load acting on the lever 23 when the diaphragm is automatically operated equal to like load acting thereon when the diaphragm is manually operated. The operation of lever 44 which is not contemplated by this invention will not be described in detail. A diaphragm operating pin 29 in engagement with one end of the diaphragm driving lever 27 is operable, following the lever 27, and is associated with the diaphragm on the lens. When the shift lever 20 moves up, initiating the upward movement of the mirror 18, the intermediate lever 22 turns in a clockwise direction in operative relation thereto (FIG. 3). By virtue of the counterclockwise turning of the intermediate diaphragm lever 23 caused by the turning of the lever 22, the pin 29 stops down the diaphragm to a preset position. A cam plate 42 pivoted to a pin 420 is urged by a spring 421 in a counterclockwise direction and has a cam portion 42a in sliding contact with the arm 23b of the intermediate diaphragm lever 23 and a gear portion 42b. A flywheel 43 pivoted to a pin 430 has a gear 43a meshing with the gear portion 42b and acts to brake the counterclockwise turning of the lever 23 and to thereby delay its movement, giving a period of time after the magnet switch 14 has been closed until the diaphragm is stopped down and the shutter is tripped. Thus the flywheel 43 assures stable energization of the magnet 10 and stabilizes the diaphragm.

The shutter mechanism will be described with reference to FIG. 5. A release lever 30 pivoted to a pin 300 has a lug 30a for engaging a projection 31d of a control lever for operating a shutter opening blade to retain the lever 31 before shutter release. The control lever 31 is rotatably supported by a pin 310 and is biased in a clockwise direction by an unillustrated spring. The lever 31 has a pin 31b for releasing the shutter opening blade when the mirror 18 is raised and the diaphragm is completely stopped down after the lever 31 is freed from the release lever 30. The lever 31 has an arm 31c for closing the first switch 8, namely trigger switch, in response to a shutter release action, the arm being turnable in a counterclockwise direction in operative relation to film winding operation after the shutter has been tripped to cock the shutter opening blade. The lever 31 further has another arm 31a for cocking the shutter closing blade. A holding lever 33 pivoted to the same pin 310 as the control lever 31 has an end 33a for engaging a shutter opening drive lever 32 and a lug 33b engageable with a pin 31b on the control lever 31 to disengage a shutter opening drive lever 32 from the lever 33. The drive lever 32 is pivoted to a pin 320 and is urged in a clockwise direction by a spring 321. The lever 32 has a hooked portion 32b at its end in engagement with the end 33a of the holding lever 33 and a pin 32a provided on that end and positioned in an arcuate slot 39. By virtue of the clockwise movement, the lever 32 moves the shutter opening blade. A closing drive lever 34 pivotally mounted on a pin 340 and urged in a clockwise direction by a spring 341 has a pin 34a for cocking the shutter closing blade by being pushed by the end of arm 31a of the control lever 31 when the lever 31 is turned counterclockwise by film winding operation subsequent to shutter release operation. The lever 34 further has a pin 34b to be associated with the shutter closing blade. The pin 34b is positioned in an arcuate slot 38 formed in the shutter base plate. A closing latch lever 35 pivoted to a pin 350 causes a lever 36 on the same pin 350 to latch the closing drive lever 34 upon completion of cocking of the shutter. Provided between the lever 35 and the control lever 31 is a kick spring 46 which, when the shutter is in its completely cocked position, biases the latch lever 35 in a clockwise direction, whereby an attraction piece 37 on its end is held in intimate contact with the electromagnet 10. The clockwise movement of the control lever 31 following shutter release action displaces the kick spring 46 to the position shown in FIG. 5b, permitting the spring 46 to act in a direction opposite to that in FIG. 5a. The spring action is weaker than the attraction of the electromagnet 10 which is exerted on the piece 37 when the magnet is energized. After deenergization of the magnet, the spring causes the latch lever 35 and lever 36 to release the shutter closing blade. The lever 36 on the pin 350 is biased in a clockwise direction by an unillustrated spring. When the shutter is in its cocked position, the projection 36a of the lever 36 engages a portion 34c of the closing drive lever 34. Deenergization of the electromagnet 10 allows the kick spring 46 to turn the closing latch lever 35 in a counterclockwise direction, so that a pin 35a on the lever 35 turns the lever 36 in a counterclockwise direction to release the closing drive lever 34.

The shutter mechansim operates in the following manner. Depression of the shutter button moves the drive plate 21 from its lowered position in FIG. 3a to the raised position in FIG. 3b, raising the shift lever 20 while tensioning the returning spring therefor. By virtue of engagement of the pin 19a in the slit 20a of the lever 20, this movement turns the mirror operating lever 19 clockwise about a pin 190 to raise the mirror 18. The slight clockwise movement of the lever 19 turns the cam lever 24 in a counterclockwise direction by a large amount and closes the magnet switch 14 to energize the electromagnet 10. With this movement, the release lever 30 shown in FIG. 5 turns in a counterclockwise direction, so that the control lever 31 starts to move in a clockwise direction. Furthermore, since the intermediate lever 22 turns in a clockwise direction simultaneously with retraction of the mirror to the photographing position in the course of rise of the shift lever 20, the intermediate diaphragm lever 23 closes the second switch 7 as seen in FIG. 4b. Further through the link plate 26, levers 28 and 44, the movement of the lever 23 frees the diaphragm operating pin 29 from diaphagm open position and brings the same to a preset position. To ensure stable energization of the magnet 10 in the course of the above operation, the magnet switch 14 is closed preferably at the initial stage of shutter release operation, while the second switch 7 may be in closed position before the shutter is opened. This construction will be described later with reference to another embodiment to follow. When the mirror 18 moves upward and the diaphragm stoppingdown operation is completed, the control lever 31 shown in FIG. 5 has its pin 31b engaged with the lug 33b of the holding lever 33, turning the lever clockwise, so that the opening drive lever 32 is released into clockwise movement. With the initiation of motion of the shutter opening blade, the arm 31c of the control lever 31 closes the trigger switch 8. Consequently, the electronic shutter starts its counting operation. When the collector voltage of the transistor 4 reaches a preset level, the electromagnet 10 is deenergized. The clockwise movement of the control lever 31 permits the kick spring 46 to turn the latch lever 35 in a counterclockwise direction as well as the lever 36, unlatching the closing drive lever 34, whereby the shutter opening blade is released to complete an exposure as seen in FIG. 5b. With the completion of movement of the shutter opening blade, the drive plate 21 is freed from its raised position, with the result that the shift lever 20 is returned to its original position by the compressed spring acting thereon. The intermediate diaphragm lever 23 also turns in a clockwise direction to the position of FIG. 4a under the action of the spring 41, opening the second switch 7. Thus when the operation of the shutter closing blade is completed, the first switch 8 (trigger switch) is in its closed position, and the second switch in its open position.

The shutter is subsequently cocked, turning the control lever 31 in a counterclockwise direction. The pin 31e therefore pushes the rear end 32c of the opening drive lever 32 and the arm 31a pushes pin 34a of the closing drive lever 34, thus moving both the levers 32 and 34 in a counterclockwise direction. The arm 31c opens the trigger switch 8. In this way, the shutter mechanism is brought to the state shown in FIG. 5a from the state of FIG. 5b.

FIGS. 6a and 6b show another embodiment according to this invention in which the second switch 7 is disposed in the path of movement of a pin 34a on the closing drive lever 34 so that the switch 7 is closed by the lever 34 when the shutter is in its cocked position before tripping the shutter. The switch is opened simultaneously with the initiation of movement of the shutter closing blade by shutter tripping operation.

The electric circuit and the other mechanism of this embodiment are the same as those illustrated in FIG. 2 to 5.

As already described, the device of this invention includes the first and second switches which are provided between the emitter of the antilogarithmic conversion transistor and the connection of the emitter to the lead wire connected to one terminal of the power source, the switches being arranged in series with each other. The first switch is closed with the initiation of shutter opening action following shutter release operation and is subsequently opened by shutter cocking operation. The second switch is closed during the period following the shutter cocking operation before the shutter is opened after the shutter button is depressed and is opened after the initiation of shutter closing action. This construction eliminates the influence to be otherwise exerted on the exposure by a voltage drop resulting from the provision of the two switches, assuring exposure time control with remarkably improved accuracy. The first and second switches are opened and closed in operative relation to the shutter mechanism or to means operatively associated therewith and are therefore openable and closable with accurate and proper timing in conformity with the shutter operation.

What is claimed is:

1. An automatic exposure time control device for use in a single lens reflex camera including anobjective lens, a shutter and a diaphragm, said exposure control device comprising:
   a light measuring circuit for generating an output voltage proportional to the logarithm of the intensity of light which has come from an object to be photographed and passed through said objective lens and said diaphragm;
   means for storing said output voltage;
   means connected to one terminal of said storing means for converting said output voltage stored in said storing means to a current proportional to the antilogarithm thereof;
   means for integrating said current;
   means for commencing the integration of said integrating means simultaneously with commencement of the opening of said shutter due to shutter release operation;
   means for controlling the closure of said shutter depending on the voltage across said integrating means;
   a power source for providing electric power to said lightmeasuring circuit, converting means and controlling means;
   first and second conductive means respectively connected to the opposite terminals of said power source, said light measuring circuit, converting means and said control means being connected between said first and second conductive means in parallel with each other, said integrating means being connected between said converting means and second conductive means, and another terminal of said storing means being connected to said first conductive means;
   a first switch openable in response to shutter cocking operation and closable in response to the shutter release operation prior to commencement of the opening of said shutter; and
   a second switch closable at the latest with the commencement of opening of said shutter and at the earliest with the cocking of said shutter and openable at the earliest with the commencement of closure of said shutter, said first and second switches being arranged between said first conductive means and said converting means in series with each other and in parallel with said controlling means.

2. An automatic exposure time control device of claim 1 wherein said converting means includes a transistor having a low input impedance, the collector of which is connected to said second conductive means through said integrating means, the base of which is connected to said one terminal of said storing means, and the emitter of which is connected to said first conductive means through said first and second switches.

3. An automatic exposure control device of claim 2, further comprising a third switch closable in response to the shutter release operation prior to the opening of said shutter and openable in response to the closure of said shutter, said third switch being arranged in said second conductive means so that the electric power of said power source cannot be applied to said transistor and said controlling means when said third switch is opened.

4. An automatic exposure time control device of claim 3, further comprising:
   first movable means movable to a first position for stopping down said diaphragm in response to the shutter release operation and to a second position for opening said diaphragm to a full aperture in response to the completion of closure of said shutter, said first movable means being associated with said second switch so as to close and open the latter when the former is in said first position and in said second position respectively;
   second movable means movable to a first position for cocking said shutter in response to the shutter cocking operation and to a second position for opening said shutter in response to the shutter release operation after completion of the movement of said first movable means to said first position, said second movable means being associated with said first switch so as to open and close the latter when the former is in said first position and in said second position respectively.

5. An automatic exposure time control device of claim 3, further comprising:
   first movable means movable to a first position for cocking said shutter in response to the shutter cocking operation and to a second position for opening said shutter in response to the shutter release operation, said first movable means being associated with said first switch so as to open and close the latter when the former is in said first position and in a second position respectively,
   wherein said control means includes second movable to a cocked position in response to the movement of said first movable means to said first position and to a released position for closing said shutter when the voltage across said integrating means reaches a predetermined level, said second movable means being associated with said second switch so as to close and open the latter when the former is in said cocked position and in said released position respectively.

* * * * *